United States Patent Office 2,981,737
Patented Apr. 25, 1961

2,981,737

PYRIDINE COMPOUNDS AND METHODS FOR PRODUCING THE SAME

Erik F. Godefroi, Harper Woods, Mich., assignor to Parke, Davis & Company, Detroit, Mich., a corporation of Michigan No Drawing. Filed Mar. 6, 1958, Ser. No. 719,499

6 Claims. (Cl. 260—293)

This invention relates to new pyridine compounds and to methods for producing the same. More particularly, the invention relates to pyridine compounds and acid-addition salts thereof which have, in their free base form, the formula,

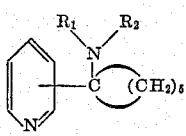

where $R_1$ and $R_2$ are the same or different and represent hydrogen or lower alkyl radicals or together with —N< a pyrrolidino, piperidino, lower alkyl substituted pyrrolodino or lower alkyl substituted piperidino radical.

In accordance with the invention, the pyridine compounds of the above formula and acid-addition salts thereof may be produced in a number of ways. For example, the compounds wherein $R_1$ and $R_2$ are lower alkyl radicals or joined together with —N< to form a heterocyclic ring can be prepared by reacting a pyridyl magnesium halide of formula,

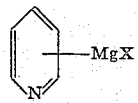

with a 1-cyanocyclohexyl amino compound of formula,

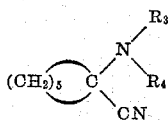

under anhydrous conditions and decomposing the resulting product with water; where $R_3$ and $R_4$ are lower alkyl radicals or together with —N< a pyrrolidino, piperidino, lower alkyl substituted pyrrolidino or lower alkyl substituted piperidino radical and X is a halogen atom. The initial phase of the reaction is carried out in a non-hydroxylic organic solvent such as an ether or a hydrocarbon like benzene, toluene, xylene or petroleum ether and at a temperature between about 0 and 100° C. The relative quantities of the two reactants is not critical but it is preferable to use either approximately equivalent amounts or a slight (10 to 20%) excess of the pyridyl magnesium halide. The decomposition phase of the reaction can be carried out using water alone, aqueous acid, aqueous ammonium chloride, ammonium hydroxide and the like.

The pyridine compounds containing a secondary amino group, that is, where $R_1$ is hydrogen and $R_2$ is a lower alkyl radical, are preferably prepared by reacting a pyridyl alkali metal compound of formula,

with an N-cyclohexylidene amine of formula,

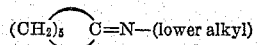

under anhydrous conditions and decomposing the resulting product with water; where M is an alkali metal, preferably lithium. The initial phase of the reaction is carried out under anhydrous conditions in a non-hydroxylic organic solvent such as an ether or a hydrocarbon like benzene, toluene, xylene and petroleum ether. The temperature may be varied between about 0 and 100° C. The relative quantities of the two reactants is not particularly critical but in most instances it is preferable to use approximately equivalent amounts.

The pyridine compounds containing a dialkylamino or monoalkylamino group can also be prepared by alkylation of the appropriate corresponding primary or secondary amino compound of formula,

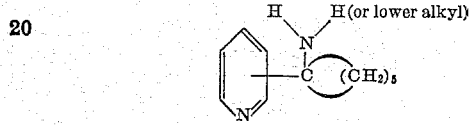

The alkylation can be carried out using methods normally employed for the alkylation of primary and secondary amines such as, for example, reaction with an alkyl halide, dialkyl sulfate or a mixture of formaldehyde and formic acid. The alkylation can also be carried out in a step-wise fashion by first acylating the primary or secondary amino compound and reducing the carbonyl group in the amido compound so obtained. The reduction is preferably carried out using lithium aluminum hydride. The monoalkylamino compounds can also be prepared by reductive alkylation of the primary amino compound. Such reductive alkylation can be carried out by reacting the primary amino compound with an aldehyde or ketone and subjecting the reaction mixture to catalytic hydrogenation.

The [1-(1-amino)cyclohexyl]pyridines can be produced by converting the carboxylate function present in a [1-cyclohexyl]pyridine compound of formula,

to a primary amino group; when Z is a carboxylate function such as a primary amide, carboxyl, carboxylate ester or nitrile group. In the case where Z is a primary amide group this can be accomplished by treatment of the [1-(1-carboxamido)cyclohexyl]pyridine with an alkali metal hypohalite followed by the hydrolysis of the resultant isocyanate with a strong aqueous solution of a mineral acid. When the initial reaction is carried out in the presence of an alcohol, the product is the carbamate which can also be hydrolyzed with acid. Where Z is a carboxyl group, the [1-(1-carboxy)cyclohexyl] pyridine in a strong mineral acid is treated with hydrazoic acid. Where Z is a carboxylate ester group, the hydrazide is prepared by the action of hydrazine on the ester, the hydrazide is treated with nitrous acid to produce the azide, the azide treated with a lower aliphatic alcohol to produce the carbamic acid alkyl ester and the latter product treated with a strong mineral acid. The azide can also be prepared from [1-(1-carboxy)cyclohexyl]pyridine by the action of thionyl chloride followed by reaction of the acid chloride with an alkali metal azide. The azide obtained by this method can be converted to the amine in the previously described manner. Where Z is a nitrile group, the [1-(1-cyano)cyclohexyl]pyridine can be treated with hydroxylamine to obtain the amido oxime, the amido oxime treated with benzene-sulfonyl chloride to produce the urea compound which can then be hydrolyzed with a strong alkali. Alternatively, the nitrile can be hydrolyzed to the amide which is treated as described above.

The free base compounds having the first formula given above are converted to their acid addition salts by reaction with the corresponding inorganic or organic acid. Some examples of the salts which can be prepared in this manner are the mineral acid salts such as the hydrochloride, hydrobromide, sulfate and phosphate; organic acid salts such as succinate, benzoate, acetate and p-toluene sulfonate; and salts with other strong acids such as the sulfamate.

The products of the invention upon either oral or parenteral administration to animals and humans produce a depressant-like effect upon the central nervous system. They are useful in both veterinary and human medicine as anesthetics or adjuncts in anesthesia. They are also useful in the treatment of hyper-excitability in both animals and humans.

The invention is illustrated by the following examples.

*Example 1*

5.75 grams of sodium is dissolved in 150 ml. of methanol and the resulting solution cooled to 20° C. 10.2 grams of 1-(2-pyridyl)cyclohexanecarboxamide in 150 ml. of methanol is added with stirring. 10 grams of bromine is added drop-wise with stirring and the reaction mixture heated under reflux for one and one-half hours. 15 ml. of glacial acetic acid is added and the methanol removed by distillation in vacuo. The residue is extracted with ether, the ether extract combined, and the ether removed by distillation. Recrystallization of the residue from isooctane gives the desired methyl N-[1-(2-pyridyl)-cyclohexyl]carbamate; melting point 87–88° C.

A mixture consisting of 4.1 grams of methyl N-[1-(2-pyridyl)cyclohexyl]carbamate and 80 ml. of concentrated hydrochloric acid is heated under reflux for 18 hours. The reaction mixture is cooled, made alkaline with 5-normal sodium hydroxide solution and the cool reaction mixture extracted with several volumes of ether. The ether extracts are combined, dried over sodium hydroxide and the drying agent removed by filtration. An excess of isopropanolic hydrogen chloride is added to the solution containing the free base of 2-[1-(1-amino)cyclohexyl]pyridine and the hydrochloride salt which is produced is collected by filtration. The product is purified by recrystallization from a mixture of ethanol and ether to obtain the desired 2-[1-(1-amino)cyclohexyl]pyridine dihydrochloride in pure form; M.P. 241–242° C.

If desired, the free base can be prepared from the hydrochloride salt by dissolving the hydrochloride salt in water, making the solution alkaline with sodium hydroxide solution, and extracting the free base with ether. Evaporation of the ether yields the desired free base of 2-[1-(1-amino)cyclohexyl]pyridine.

*Example 2*

5.5 ml. of acetic anhydride is added to a solution of 8.8 grams of 2-[1-(1-amino)cyclohexyl]pyridine in 90 ml. of benzene and the reaction mixture heated under reflux for one hour. The reaction mixture is cooled, washed with an excess of 2-normal sodium hydroxide solution, and the benzene layer removed and dried. The benzene is removed by distillation and the residue which consists of the desired 2-[1-(1-acetamido)cyclohexyl]pyridine purified by recrystallization from benzene-isooctane mixture; M.P. 141–142° C.

8.4 grams of 2-[1-(1-acetamido)cyclohexyl]pyridine is added to 8 grams of lithium aluminum hydride in 700 ml. of dry ether and the reaction mixture heated under reflux for three hours. The reaction mixture is decomposed with water, sodium hydroxide solution and water in that order. The ether solution is separated and the ether removed by evaporation. The residue is purified by recrystallization from isooctane to obtain the desired 2-[1-(1-ethylamino)cyclohexyl]pyridine; M.P. 63.5–64° C.

*Example 3*

48 grams of butyl bromide in 50 ml. of ether is added to 5.05 grams of lithium in 300 ml. of anhydrous ether at 5° C. The reaction mixture is stirred for 1½ hours at 10° C., and then 37.8 grams of 2-bromopyridine in 150 ml. of ether is added to the solution at −18° C. over a six-minute period. The reaction mixture is stirred for ten minutes and then 50 grams of N-cyclohexylidene ethylamine is added slowly. The reaction mixture is stirred for 30 minutes, keeping the temperature between −25 and −18° C., decomposed with water and the organic layer washed well with water. The organic layer is removed, dried and the solvent removed by distillation. Distillation of the residue in vacuo yields the desired 2-[1-(1-ethylamino)cyclohexyl]pyridine; B.P. 90–100° C. at 0.1 mm.

The hydrochloride salt of 2-[1-(1-ethylamino)cyclohexyl]pyridine can be prepared by dissolving the free base in ether and adding an excess of isopropanolic hydrogen chloride. The salt is collected and purified by recrystallization from isopropanol-ether mixture. The hydrobromide salt can be prepared in the same manner by substituting hydrogen bromide for the hydrogen chloride used in the preparation of the hydrochloride salt.

*Example 4*

1.47 grams of formic acid and 0.9 gram of 38% formaldehyde are added to 2.04 grams of 2-[1-(1-ethylamino)cyclohexyl]pyridine and the reaction mixture warmed on a steam bath for three hours. The reaction mixture is cooled, made alkaline with 5-normal sodium hydroxide solution and extracted with several volumes of ether. The ether extract is dried, the ether distilled and the residue treated with ½ equivalent of isopropanolic hydrogen chloride. The mixture is triturated with ether to obtain a low melting solid which is 2-[1-(1-methylethylamino)cyclohexyl]pyridine monohydrochloride.

If desired, the free base of 2-[1-(1-methylethylamino)-cyclohexyl]pyridine can be prepared by dissolving the monohydrochloride salt in water and treating the solution with an excess of sodium hydroxide solution. The free base is extracted with ether, the ether solution dried and the ether removed by distillation. The residue is the desired product.

*Example 5*

135 grams of butyl bromide in 150 ml. of dry ether is added to 15.1 grams of lithium in 900 ml. of dry ether at 5° C. The reaction mixture is stirred for 1½ hours at 10° C. 116.4 grams of 2-bromopyridine in 400 ml. of ether is added to the aforementioned solution at −18° C. over a 20-minute period. The reaction mixture is cooled to −60° C. and then 115 grams of N-cyclohexylidene methylamine is added slowly. The temperature during the addition rises to about −40° C. The reaction mixture is allowed to warm to room temperature and then decomposed with water. The ether layer is removed, washed with water and dried over sodium hydroxide. The ether is removed by distillation and the residue distilled in vacuo to obtain the desired 2-[1-(1-methylamino)cyclohexyl]pyridine; B.P. 72–74° C. at 0.08 mm.

The hydrochloride salt of 2-[1-(1-methylamino)cyclohexyl]pyridine can be prepared by dissolving the free base in ether and adding an excess of isopropanolic hydrogen chloride. The crude salt is collected and purified by recrystallization from isopropanol-ether mixture.

*Example 6*

8 grams of 2-[1-(1-methylamino)cyclohexyl]pyridine is added to a mixture of 6.35 grams of formic acid and 3.7 grams of 38% formaldehyde and the reaction mixture heated on a steam bath for three hours. The reaction mixture is cooled and treated with 15 ml. of 5-normal sodium hydroxide solution. The reaction mixture is extracted with ether, the ether extracts combined and the extracts dried. The ether is removed by distillation and the residue distilled in vacuo to obtain the desired 2-[1-(1-dimethylamino)cyclohexyl]pyridine; B.P. 72–75° C. at 0.08 mm.

The hydrochloride salt of 2-[1-(1-dimethylamino)cyclohexyl]pyridine can be prepared by dissolving the free base in ether and treating the solution with an excess of isopropanolic-hydrogen chloride. The salt is collected and purified by recrystallization from isopropanol-ether mixture.

Example 7

2 grams of 20% palladium on charcoal catalyst is added to a solution containing 17.6 grams of 2-[1-(1-amino)cyclohexyl]pyridine and 6 grams of propionaldehyde in 100 ml. of ethanol. The resulting mixture is reduced with hydrogen under four atmospheres of pressure until the theoretical amount of hydrogen is absorbed. The catalyst is removed by filtration and the solvent evaporated from the filtrate. Distillation of the residue in vacuo yields the desired 2-[1-(1-propylamino)cyclohexyl]pyridine.

Example 8

5.75 grams of sodium is dissolved in 150 ml. of methanol and the solution cooled to 20° C. 10.2 grams of 1-(3-pyridyl)cyclohexanecarboxamide in 150 ml. of methanol is added with stirring. 10 grams of bromine is added dropwise with stirring to the solution and the reaction mixture heated under reflux for one and one-half hours. 15 ml. of glacial acetic acid is added and the ethanol removed by distillation in vacuo. The residue is extracted with ether, the ether extracts combined and the ether removed by distillation. The residue is the desired methyl N-[1-(3-pyridyl)cyclohexyl]carbamate.

A mixture composed of 4 grams of methyl N-[1-(3-pyridyl)cyclohexyl]carbamate and 75 ml. of concentrated hydrochloric acid is heated under reflux for 18 hours. The reaction mixture is cooled, made strongly alkaline with 5-normal sodium hydroxide solution and extracted with several volumes of ether. The ether extracts are combined, dried and the drying agent removed by filtration. An excess of isopropanolic hydrogen chloride is added to the filtrate and the desired 3-[1-(1-amino)cyclohexyl]pyridine dihydrochloride which separates is collected. The product is purified by recrystallization from the mixture of methanol and ether.

If desired, the free base of the 3-[1-(1-amino)cyclohexyl]pyridine can be prepared by dissolving the dihydrochloride salt in water and making the solution strongly alkaline. The free base is extracted with ether, the ether extract dried and the ether distilled.

Example 9

145 grams of 2-bromopyridine is added to a solution of butyl lithium prepared from 16 grams of lithium and 116 ml. of butyl bromide in 900 ml. of anhydrous ether keeping the temperature at −40° C. The reaction mixture is stirred for 10 minutes and then treated with a solution of magnesium bromide prepared by gradually adding 86 ml. of ethylene dibromide in 250 ml. of ether to 26 grams of magnesium in 100 ml. of ether. The temperature during the addition is maintained at −50° C. The reaction mixture is stirred until the temperature rises to approximately 5° C. 116 grams of 1-(1-piperidino)cyclohexanecarbonitrile in 500 ml. of ether is added slowly with stirring. Approximately 2 liters of benzene is added to the reaction mixture and the ether demoved by distillation until the temperature of the reaction mixture reaches approximately 80° C. The resulting mixture is heated under reflux for sixteen hours and then decomposed by the cautious addition of water.

The organic phase is separated, the benzene solution dried, and the benzene removed by distillation. Distillation of the residue in vacuo yields the desired 2-[1-(1-piperidino)cyclohexyl]pyridine; B.P. 105–108° C. at 0.08 mm.; M.P. 58–59° C.

If desired, the hydrochloride salt of 2-[1-(1-piperidino)cyclohexyl]pyridine can be prepared by dissolving the free base in ether and adding an excess of isopropanolic hydrogen chloride. The salt which precipitates is collected and purified by recrystallization from isopropanol-ether mixture.

The 1-(pyridyl)cyclohexanecarboxamides used as starting materials in the practice of the invention can be prepared by reacting the corresponding pyridine acetonitrile with pentamethylene dibromide to obtain the 1-(pyridyl)cyclohexanecarbonitrile which is then hydrolyzed with mineral acid to the corresponding carboxamide. The following specific example illustrates the application of this method to the preparation of the starting material for Example 1.

A mixture consisting of 180 grams of 2-pyridyl acetonitrile, 204 ml. of pentamethylene dibromide and 200 ml. of ether is added over a period of 6 hours with stirring to 320 grams of 50% sodamide in xylene in 3 liters of dry ether. After the addition has been completed, the mixture is stirred for 16 hours and then decomposed by the cautious addition of water. The reaction mixture is filtered and the organic phase removed by decantation. The organic phase is dried and the solvents removed by distillation. Distillation of the residue in vacuo yields the desired 1-(2-pyridyl)cyclohexanecarbonitrile; B.P. 115–117° C. at 0.8 mm.; M.P. 55.5–56° C.

A mixture consisting of 186 grams of 1-(2-pyridyl)cyclohexanecarbonitrile, 200 grams of concentrated sulfuric acid and 1000 ml. of trifluoroacetic acid is heated under reflux for 18 hours. The trifluoroacetic acid is removed by distillation in vacuo and the residue poured onto ice. The solution is made strongly alkaline with 5-normal sodium hydroxide solution, cooled, and the desired 1-(2-pyridyl)cyclohexanecarboxamide collected and purified by recrystallization from ethanol; M.P. 152–153° C.

What is claimed is:

1. A pyridine compound selected from the group consisting of a free base and its pharmaceutically acceptable acid addition salts, said free base having the formula,

where $R_1$ and $R_2$ are members selected from the group consisting of hydrogen and lower alkyl and further members wherein $R_1$ and $R_2$ together with —N< constitute pyrrolidino and piperidino.

2. 2-[1-(1-ethylamino)cyclohexyl]pyridine.
3. 2-[1-(1-amino)cyclohexyl]pyridine dihydrochloride.
4. 2-[1-(1-amino)cyclohexyl]pyridine.
5. 2-[1-(1-piperidino)cyclohexyl]pyridine.
6. 2-[1-(1-piperidino)cyclohexyl]pyridine dihydrochloride.

References Cited in the file of this patent

UNITED STATES PATENTS

| | | |
|---|---|---|
| 2,647,122 | Archer | July 28, 1953 |
| 2,711,428 | Goodson | June 21, 1955 |

OTHER REFERENCES

Degering: An Outline of Organic Nitrogen Compounds, 4th edition, pp. 202, 203 and 304–306 (1945).

Kursanov: Chem. Abst., vol. 1, page 2093 (1907).

Kurssanow: Chem. Zentral-Blatt, Jahrg 78, p. 1744 (1907).